Jan. 25, 1949.　　　F. O. HESS　　　2,460,086
HEAT TREATING
Filed Dec. 14, 1944
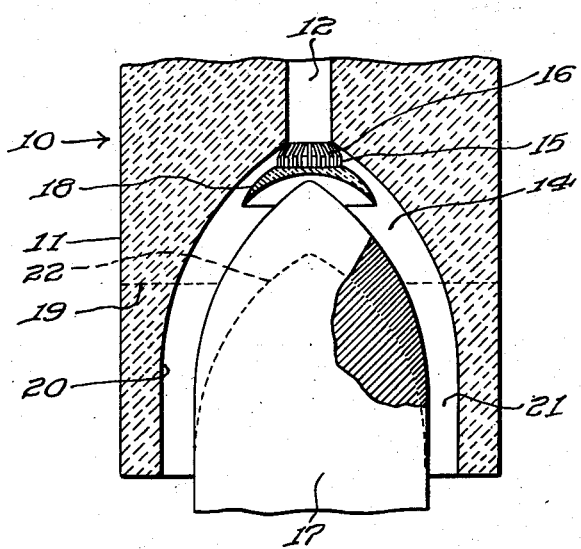
INVENTOR
Frederic O. Hess Patented Jan. 25, 1949

2,460,086

UNITED STATES PATENT OFFICE 2,460,086

HEAT-TREATING

Frederic O. Hess, Philadelphia, Pa., assignor to Selas Corporation of America, Philadelphia, Pa., a corporation of Pennsylvania Application December 14, 1944, Serial No. 568,147

4 Claims. (Cl. 263—2)

My invention relates to a method of and apparatus for heat treating metallic bodies, and particularly to an open gas fired arrangement for heat treating irregular-shaped bodies and bodies having relatively sharp edge portions. Further, it is an object of the invention to provide an improvement for hardening such ferrous metallic bodies wherein surface areas are rapidly heated to the hardening temperature for a desired depth, and then cooled to harden the same.

In recent years considerable study has been given to the problem of rapidly heat treating and hardening irregular-shaped metallic bodies. When using gaseous fuel for heat treating and hardening operations, it has generally been the practice heretofore to employ a mixture of oxygen and acetylene, and to provide one or more burner tips for using such mixture to produce a single high temperature oxy-acetylene flame or a plurality of such flames which are moved in a particular manner or follow a definite pattern of movement over the work surfaces to be heat treated or hardened. Not only does this require using relatively expensive acetylene as a fuel, but it does not lend itself to rapid heat treatment and hardening of metallic bodies, especially in instances where it is desired to heat treat and harden metallic bodies in a continuous process on a mass production basis.

It has also been the practice heretofore to heat treat and harden metallic bodies in furnaces, and to rely on heat radiated from the furnace walls to effect heating of the metallic bodies. However, this method of heat treating and hardening is relatively slow and effects heating of ferrous metallic bodies to a hardening temperature at the rate of about 1" in depth per hour of heating. Moreover, furnace heating does not lend itself to rapid heat treating and hardening of metallic bodies in a continuous process in production line machinery.

It is an object of my invention to provide an improvement whereby radiant heating accomplished by combustion of a gaseous fuel mixture can be effectively employed in an open arrangement for rapidly heat treating irregular-shaped metallic bodies. I accomplish this by providing a refractory lined combustion space in which combustion of a gaseous fuel mixture is effected and into which the irregular-shaped metallic bodies in rapid succession can be positioned for heat treatment and then withdrawn.

Another object of my invention is to provide such a refractory lined open combustion space in which the surface areas to be heat treated and hardened are rapidly heated to an elevated or hardening temperature by heat radiated from the refractory lining which is heated to incandescence by heated gases flowing in contact therewith, and by heat derived from the heated gases themselves which spread out in a narrow gap between the refractory lining and the work and also pass rapidly over and in intimate contact with surface areas to be heated.

The gaseous mixture is supplied to the space at such a pressure and rate that the incandescence of the refractory lining is maintained and heat radiated therefrom promotes substantially complete combustion within the space. The metallic bodies to be heat treated, which are supported outside the space, are positioned closely adjacent to and spaced with respect to the refractory lining to provide a narrow gap therebetween, so that relatively large volumes of heated gases at an extremely high temperature will pass in intimate contact with both the lining and the surface areas to be heat treated.

Another object of my invention is to provide a member of refractory material in the combustion space for shielding an edge portion or region of reduced section of a metallic body, whereby different surface portions can be heated to the same elevated or hardening temperature at substantially the same time.

The above and other objects and advantages of the invention will be better understood from the following description taken in conjunction with the accompanying drawing forming a part of this specification, and of which the single figure is a fragmentary sectional view more or less diagrammatically illustrating an open heating unit for heat treating metallic bodies in accordance with the principles of this invention.

Referring to the drawing, a heating unit 10 for practicing the invention comprises a refractory block 11 which may be square or rectangular in cross section and formed of ceramic material. The rear or upper end of block 11 is formed with a centrally disposed passage 12 into which a combustible gas mixture is introduced from a suitable source of supply. The lower end of passage 12 communicates with a space 14 formed in the block 11 which becomes increasingly larger in section from the passage 12 to the front or lower open end of the block.

A tip or distributor 15 is fixed to the block 11 at the lower end of passage 12 for subdividing the gas mixture into a plurality of small gas streams. The tip 15 is of circular shape and formed with a plurality of grooves or passages 16 at the peripheral surface thereof, so that the small gas streams are discharged radially outward into the upper part of space 14 in which combustion of the gas mixture is effected.

The space 14 serves as an open-ended heating chamber which is shaped to receive an irregular-shaped body supported outside the chamber and of reduced size at one end. In the embodiment illustrated the space 14 is shaped to receive the nose of an armor piercing projectile 17 adapted to be heated to an elevated hardening temperature. It is to be understood, however, that the space 14 can be shaped differently from that illustrated for heat treating metallic bodies of other shapes.

For reasons which will be given presently, an arcuate-shaped or curved member 18 is fixed to the lower end of the tip 15. The member 18 is formed of ceramic material and more or less shields the extreme upper end of projectile 17 from the inner refractory lining of space 14.

The heating unit 10 described and illustrated embodies the radiant heating principle disclosed in my Patent No. 2,215,079, granted on September 14, 1940, and assigned to the same assignee as this application. In that patent a combustible gas mixture is introduced into a central passage and divided into a plurality of small gas streams by a distributor or tip like the tip 15, and combustion of the small gas streams is effected in a cavity or cup-shaped space which is considerably shorter in depth than the space 14 and terminates approximately at the region of dotted line 19 in the drawing.

The radiant heating principle in the above-mentioned patent embodied in heating unit 10 is that the upper curved part of space 15 is of such shape, and the small gas streams issue at such an angle from the axis of the heating unit through the grooves 16, that the burning gas streams are closely adjacent to and follow the outwardly flaring refractory wall surface to heat the latter to a highly radiant condition. The burning gas streams flare outwardly at such an angle from the axis of the heating unit that flame impingement of the metallic body is avoided. When the cup-shaped cavity terminates at the region of the dotted line 19, as disclosed in the above-mentioned patent, an operating characteristic which prevails is that the individual flames bend away from the outwardly flaring refractory wall surface and the products of combustion immediately beyond the outer rim of the cavity are drawn back into the center of the cup-shaped space, due to the lower pressure existing in this region which is enveloped by the small burning gas streams.

In accordance with this invention, the highly heated products of combustion formed in the upper part of space 14, and in the region above the dotted line 19, are utilized to heat to incandescence additional refractory wall surface, and such additional refractory wall surface is adapted to be located at close range to the surface portions of the work to be heat treated, whereby the relatively large volumes of heated products of combustion that are formed, which are at an exceedingly high temperature, can flow rapidly past and in intimate contact with such additional refractory wall surface to heat the latter to a highly radiant condition. Not only are the surface portions to be heat treated heated by radiant heat from such additional wall surface, but also by the rapidly flowing heated products of combustion which come in intimate contact with the surface portions of the work.

The principles of the invention are embodied in the heating unit 10 by forming the block 11 and space 14 therein so that, in addition to the space above the dotted line 19 in which combustion of the small gas streams is accomplished, additional refractory wall surface 20 is provided for a substantial distance below the dotted line 19 which is commensurate with the length of the metallic body 17 to be heat treated. Not only is the additional refractory wall surface 20 requisite for practicing the invention, but such wall surface must be formed and so disposed with respect to the metallic body 17 to be heat treated that a relatively narrow gap 21 is provided therebetween, whereby the high temperature heated products of combustion will pass downwardly from the upper part of the heating chamber 14 at a relatively high velocity through the gap to heat the additional refractory wall surface 20 to a highly radiant condition. The high velocity of the heated gases passing through the gap 21 is an important factor which contributes to the high rate of heat transfer to the work in that the refractory wall surface 20 will be maintained in a highly radiant condition by always being subjected to newly formed heated products of combustion produced in the upper part of space 14. Likewise, the continuous rush of newly formed heated products of combustion, which constantly sweep over the surface areas to be heat treated, contributes to a high rate of heat input to the work.

Although I do not wish to be limited thereto, the gap 21 may be about ½ to 1 inch. When the combustible gas mixture is supplied at a pressure and rate to maintain the refractory lining of the heating chamber 14 in a highly radiant condition and the narrow gap 21 is formed therein by the work piece 17, it has been found that the gases in the heating chamber are maintained at a pressure above that of atmosphere. This is of distinct advantage because the maintenance of a pressure above atmospheric in the heating chamber 14 accelerates the rate of combustion and increases the temperature at which combustion is accomplished, whereby the inner refractory lining will be heated to a high temperature which will enable the work pieces to be heated to hardening temperatures in the shortest length of time possible.

The factors discussed above have made it possible to employ a combustible mixture of air and ordinary gas, such as city gas or natural gas, for example, to effect heat treating and hardening operations formerly accomplished only by using acetylene when performing such operations with a combustible gas mixture. Since the maximum theoretical flame temperature of a combustible mixture of air and city gas, having a rating of about 500 B. t. u. per cubic foot, is approximately 3700° F., it will be appreciated that the heating unit 10 must perform efficiently and develop sufficient capacity to transfer heat rapidly to the work surfaces to be heat treated.

When a combustible mixture of air and ordinary gas is employed, the pressure developed in the heating chamber 14 may be higher than that of the atmosphere by an amount equivalent to 1 inch of water column, and under these conditions the refractory lining may be maintained at an average temperature of about 2700° F. and in a temperature range not below 2650° F. and as much as 2850° F. and higher. Since the pressure in the heating chamber 14 is maintained above that of atmosphere, there is no swirling of heated products of combustion from regions beyond the lower open end of block 11 back into the gap 21 between the work 17 and the refractory wall surface 20, so that the heated products of combustion formed in the upper part of space 14 will be maintained at the highest possible temperature and liberate heat while at such high temperature to the inner refractory lining and also to the work 17 over whose surfaces the heated gases sweep at a relatively high velocity.

In the illustrated embodiment the surface portions of projectile 17 to be heated to an elevated hardening temperature and the depth to which such heat treatment is desired, is indicated by the dotted line 22. To heat treat a 75 mm. projectile like that illustrated and in the manner shown to an elevated hardening temperature of about 1650° F., the required heat treatment is completed in about 3 minutes when a combustible mixture of air and ordinary city gas is used. If the entire nose end of the projectile requires heat treatment to an elevated hardening temperature, that is, throughout the entire mass, a heating cycle of about 6 minutes would be necessary.

The heating unit 10 is extremely flexible in operation and lends itself to heat treating and hardening of metallic bodies in a continuous process. In such case one or more heating units 10 can be employed to form a heating station and the metallic bodies, which are supported independently of and outside the heating units, can be arranged to be moved continuously in a single or several rows toward the heating station on a suitable conveyor. The heating units may be vertically movable and arranged to move synchronously with the movement of the metallic bodies, so as to heat the latter automatically in a rapid succession. A suitable quenching station may be located adjacent to the heating station whereby the metallic bodies may be cooled from an elevated hardening temperature by a suitable cooling medium, such as water, for example, so as to harden the same.

In certain heat treating applications, as in heating the tapered nose end of the projectile 17, it is desirable to avoid overheating of the edge portion adjacent to the upper end of space 14. This is accomplished by providing the member 18 which shields the nose end of the projectile from the inner refractory lining of space 14 which is in a highly radiant condition. The space between the shield or reflector 18 and the pointed nose of the projectile is relatively small and restricts flow of the high temperature products of combustion therebetween. The heated gases flowing past the underside of the shield 18 effects heating of the latter, whereby heat is radiated therefrom to the extreme end of the nose of the projectile.

By providing the shield 18 different localized areas of the projectile 17 reach the hardening temperature at approximately the same rate and same time so that, when the projectile 17 is subsequently cooled by a suitable cooling medium, the desired hardness pattern is obtained at the nose end of the projectile.

It will now be understood that an improvement has been provided for rapidly heat treating and hardening metallic bodies or workpieces. The open-fired gas heating unit 10 is especially useful in production line machinery for heat treating a number of duplicate work pieces in rapid succession. By providing a heating unit of the character described additive quantities of radiant heat are developed when compared with prior practices, and such additional radiant heat is utilized to attain rates of heat liberation and heat transfer higher than normally attainable from combustion of a gas mixture containing air and ordinary gas. The principles involved include accelerating the combustion reaction and concentrating great heat liberation in a small space to bring the burning gases to exceedingly high temperatures, and to project radiant heat energy from surfaces at temperatures of 2850° F. and higher directly to the work at close range to effect exceptionally rapid heat transfer to work pieces.

In practicing the invention it is possible to heat treat or harden metallic work pieces rapidly in a matter of a few minutes when only using a combustible gas mixture of air and a gas, such as, for example, ordinary city gas, natural gas and the like. The work surfaces to be heat treated are heated simultaneously in a single operation without the necessity of progressively moving a single burner tip or group of burner tips in a particular manner over the work surfaces during the heat treating operation. Although I do not wish to be limited thereto, it is my belief that rapid heat treatment of ferrous metallic bodies to the critical hardening temperature of about 1650° F. in a matter of a few minutes is due to the exceptionally rapid heat penetration into the work surfaces being heat treated. This results from transmission of a major portion of the heat from refractory surfaces maintained at a highly radiant condition and at close range to the work, the radiant energy being of a wave length within the near visible infra-red portion of the spectrum and of a wave length not greater than two microns. This radiant energy, together with a high velocity stream of heated products of combustion passing through the gap formed between the refractory surfaces and the work, produces and develops temperatures of 2850° F. and higher but materially below the temperature developed by oxy-acetylene flames, whereby safe heat penetration is accomplished without the likelihood of injuring the work even when the surfaces of the work pieces to be heat treated or hardened are heated simultaneously and brought to the desired elevated temperature with steady and continuous application of heat.

This application is a division of my applications Serial No. 482,697, filed April 12, 1943, now abandoned, and Serial No. 459,680, filed September 25, 1942, now abandoned.

While a single embodiment of the invention has been shown and described, it will be apparent that modifications and changes may be made without departing from the spirit and scope of the invention, as pointed out in the following claims.

What is claimed is:

1. A heating unit for heating a number of duplicate work pieces in succession in an open arrangement comprising structure providing a refractory lined chamber closed at one end and open at the other end, means including a member at the closed end of the space having passage means therein to supply a combustible gas mixture under pressure to the space and cause the mixture to spread out for combustion adjacent to and alongside a region of the refractory lining which is at the closed end to heat such region to a highly radiant condition, the work pieces in succession being adapted to be positioned in the space through the open end thereof and then withdrawn after the desired heating of each work piece is accomplished, the chamber being of such size with respect to the work pieces that, when one of the work pieces is positioned therein, a narrow gap is formed between the work pieces and lining to cause the heated gases developed by combustion in the chamber to flow at a relatively high velocity through the gap and effect heating of the work piece by heat including heat radiated from the lining at the gap which is heated to a highly radiant condition by the heated gases flowing in contact therewith and by heat liberated from the heated gases which spread out in the gap and also pass over and in intimate contact with the work piece, and high temperature refractory shielding means associated with said member which projects beyond the latter and is spaced from and overlies the region of the lining into which the mixture is discharged from the member to prevent excessive heating of the part of each work piece adjacent to the closed end of the space.

2. A heating unit for heating a work piece in an open arrangement comprising structure providing a refractory lined chamber closed at one end and open at the other end, means including a distributor cap at the closed end of the chamber and having a plurality of orifices therein to supply a combustible gas mixture under pressure to the chamber and subdivide the mixture into a plurality of small gas streams for combustion adjacent to and alongside a region of the refractory lining which is at the closed end to heat such region to a highly radiant condition, the work piece being adapted to be supported outside the chamber and arranged to extend into the latter, the chamber being of such size with respect to the work piece that, when the work piece extends into and is positioned in the chamber, a narrow gap is formed between the work piece and the lining to cause the heated gases developed by combustion in the chamber to flow at a relatively high velocity through the gap and effect heating of the work piece by heat including heat radiated from the lining at the gap which is heated to a highly radiant condition by the heated gases flowing in contact therewith and by heat liberated from the heated gases which spread out in the gap and also pass over and in intimate contact with the work piece, and high temperature refractory shielding means associated with said cap which projects beyond the outlets of the orifices and is spaced from and overlies the region of the lining into which the jets are discharged from the orifices to prevent excessive heating of the part of each work piece adjacent to the closed end of the chamber.

3. In the art of heat treating a metal body having an edge portion, such heat treating being effected with the aid of the refractory material, the improvement which includes burning a combustible gaseous mixture so as to develop highly heated products of combustion, applying the heated products of combustion to the surface of said body including said edge portion, utilizing heat derived from burning of said gaseous mixture to heat a surface of the refractory material to incandescence whereby heat is radiated therefrom to the surface of said body adjacent to and about said portion, and shielding said edge portion from said refractory surface by a member formed of refractory material and over which the heated products of combustion flow to heat such member whereby heat is radiated therefrom to said edge portion to heat the latter, the space between said edge portion and said member forming a region into which the flow of the heated products of combustion is restricted.

4. In the method of heat treating the tapered end or nose of an armor piercing projectile with the aid of refractory material forming a combustion space, which includes the steps of positioning the tapered end of the projectile in said combustion space, heating said refractory surface to incandescence by heat liberated from combustion of a combustible gas mixture at a region adjacent to the tip of the tapered end of the projectile, whereby the tapered end will be heated by heat radiated from the incandescent refractory surface and by heated gases produced by combustion of the combustible gaseous mixture and blanketing the tapered end of the projectile, and shielding the extreme tip of the tapered end of the projectile by a member formed of refractory material and over which the heated gases flow to heat such member, whereby heat is radiated therefrom to the extreme end of the nose of the projectile, the space between the tip of the tapered end of the projectile and said member forming a region into which the flow of the heated gases is restricted.

FREDERIC O. HESS.

REFERENCES CITED

The following references are of record in the file of this patent:

UNITED STATES PATENTS

| Number | Name | Date |
|---|---|---|
| 98,767 | Haskins | Jan. 11, 1870 |
| 709,631 | Hadfield | Sept. 23, 1902 |
| 1,617,609 | Smith | Feb. 15, 1927 |
| 1,688,705 | Gray | Oct. 23, 1928 |
| 2,215,079 | Hess | Sept. 17, 1940 |
| 2,303,408 | Soderholm | Dec. 1, 1942 |
| 2,375,119 | LeTourneau | May 1, 1945 |

FOREIGN PATENTS

| Number | Country | Date |
|---|---|---|
| 107,433 | Great Britain | July 6, 1916 |